United States Patent
Carlsen et al.

[11] Patent Number: 6,155,289
[45] Date of Patent: Dec. 5, 2000

[54] METHOD OF AND SYSTEM FOR SUB-ATMOSPHERIC GAS DELIVERY WITH BACKFLOW CONTROL

[75] Inventors: Kurt A. Carlsen, Burlington, Vt.; James McManus; James Dietz, both of Danbury, Conn.

[73] Assignees: International Business Machines, Armonk, N.Y.; Advanced Technology Materials, Inc., Danbury, Conn.

[21] Appl. No.: 09/307,650

[22] Filed: May 7, 1999

[51] Int. Cl.[7] .................................................. G05D 7/06
[52] U.S. Cl. ...................... 137/457; 137/486; 137/487.5
[58] Field of Search .................... 137/457, 486, 137/487.5

[56] References Cited

U.S. PATENT DOCUMENTS

| | | | |
|---|---|---|---|
| 5,152,309 | 10/1992 | Twerdochlib et al. | 137/8 |
| 5,158,534 | 10/1992 | Berry et al. | 604/4 |
| 5,190,068 | 3/1993 | Philbin | 137/8 |
| 5,441,070 | 8/1995 | Thompson | 137/1 |
| 5,441,076 | 8/1995 | Moriya et al. | 137/486 |
| 5,771,178 | 6/1998 | Stemporzewski, Jr. et al. | 364/510 |
| 5,791,369 | 8/1998 | Nishino et al. | 137/269 |

*Primary Examiner*—Gerald A. Michalsky

[57] ABSTRACT

A sub-atmospheric gas delivery system (100) with a backflow control apparatus (10) for preventing backflow into the sub-atmospheric gas source (14). The gas delivery system includes three fluidly coupled sticks: a purge stick (120), a process gas delivery stick (124) and an evacuation stick (130). The backflow control apparatus comprises a gas line (26) fluidly coupling the sub-atmospheric gas source to a chamber (50), a valve (20) attached to the sub-atmospheric gas source for blocking fluid communication between the gas source and the gas line upon receipt of a first signal, a flow restrictor (R) in fluid communication with the gas line and positioned between the valve and the chamber, and first and second pressure transducers (P1 and P2) in fluid communication with the gas line and positioned on either side of the flow restrictor. Each transducer is capable of generating a signal representative of pressure. The backflow control apparatus further includes a valve controller unit (40) connected to the first and second pressure transducers and the valve. The controller is capable of generating the aforementioned first signal in response to the signals from the first and second pressure transducers.

29 Claims, 2 Drawing Sheets

METHOD OF AND SYSTEM FOR SUB-ATMOSPHERIC GAS DELIVERY WITH BACKFLOW CONTROL

FIELD OF THE INVENTION

The present invention relates to a method of and system for gas delivery from a sub-atmospheric gas source, and in particular to a backflow control apparatus and method suitable for same, that prevents gas from backflowing into the sub-atmospheric gas source.

BACKGROUND OF THE INVENTION

Conventional high-pressure gases are typically delivered to process tools within semiconductor fabricators (e.g., chemical vapor deposition or CVD tools) by complex gas distribution systems. Flammable, pyrophoric, and toxic compressed gases such as silane, phosphine ($PH_3$), and arsine ($AsH_3$) (pure or mixed) typically require a multiplicity of equipment for safe storage and delivery. Such equipment typically includes a gas cabinet, one or more valve manifold boxes ("VMBs"), and gas isolation boxes ("GIBs"). The gas cabinet is typically positioned remotely from the process tool or the semiconductor fabricator itself. VMBs and GIBs are typically located locally within the fabricator. These systems are typically connected with gas piping or tubing and the functions of each sub-system, when coupled together, provide total gas management (e.g., purge, evacuation and process gas supply) for a particular flammable, pyrophoric, or toxic compressed gas.

At the tool level, because CVD processes run at medium vacuum levels ($10^{-1}$–$10^{-4}$ torr), controlling the dopant partial pressure and overall pressure in the process chamber of the process tool becomes increasingly difficult when using dilute gas mixtures of such gases. The inclusion of balance gases such as helium or argon contributes additional gas molecules in the process chamber of the process tool, which results in higher operating pressures and reduced film deposition rates. Specifically, dilute fixed phosphine mixtures do not provide adequate dopant incorporation in a PSG film unless the flow of the $PH_3$ mixture is increased significantly. However, increasing the flow of the dilute $PH_3$ mixture has the effect of lowering the film deposition rate and negatively altering the process capability. In addition, there is the safety risk of a catastrophic release of gas with a high-pressure gas delivery system.

The use of sub-atmospheric gas(i.e., gas that is below 1 atmosphere) as a source gas is an alternative to high pressure gas delivery systems. Such a gas source virtually eliminates the risk of catastrophic gas releases, thus allowing the safe storage and use of such gases at 100% concentration.

Sub-atmospheric gas sources are typically stored locally in the fabricator close to the process tools for which they are intended. This minimizes pressure losses across the delivery path and, therefore, increases the deliverable quantity from the sub-atmospheric gas cylinder. Conventional gas cabinets configured for compressed gases typically do not provide adequate safety and are not capable of sub-atmospheric gas delivery or management. Gas cabinets configured for compressed gases provide neither the ability to pump purge the entire delivery path effectively, nor the ability to extract gases from the process tool to the cabinet itself. Additionally, conventional gas cabinets configured for compressed gases do not generally provide suitable capability to sense, prevent and mitigate the backflow of gases to the sub-atmospheric gas cylinder.

Lastly, conventional compressed gas cabinets do not provide sufficient detection of in-board leaks to the system and gas cylinder, mainly due to the fact the conventional systems for compressed gases are meant to operate at greater than 0 psig. Also, the limitations of conventional gas cabinets can not be overcome for sub-atmospheric gases by merely providing the additional functionality of equipment such as VMBs and GIBs. Providing the external functionality of VMBs and GIBs is not a practical option due to installation space restrictions, pressure drop restrictions, and, potentially, gas flow restrictions.

SUMMARY OF THE INVENTION

The present invention relates to a method of and system for gas delivery from a sub-atmospheric gas source, and in particular to a backflow control apparatus and method suitable for same, that prevents gas from backflowing into the sub-atmospheric gas source.

Accordingly, a first aspect of the invention is a backflow control apparatus for use with a sub-atmospheric gas source and a chamber, for preventing backflow into the sub-atmospheric gas source. The apparatus comprises a gas line fluidly coupling the sub-atmospheric gas source to the chamber, and a valve attached to the sub-atmospheric gas source. The valve blocks fluid communication between the gas source and the gas line upon receipt of a first signal. The apparatus further includes a flow restrictor in fluid communication with the gas line and positioned between the valve and the chamber, and first and second pressure transducers in fluid communication with the gas line and positioned on either side of the flow restrictor. Each transducer is capable of generating a signal representative of pressure. The backflow control apparatus further includes a valve controller unit connected to the first and second pressure transducers and the valve. The controller is capable of generating the aforementioned first signal in response to the signals from the first and second pressure transducers.

A second aspect of the invention is a method of preventing backflow into a source of sub-atmospheric gas, using the apparatus as described immediately above. The method comprises the steps of first, measuring a first pressure in the gas line between the sub-atmospheric gas source and the flow restrictor, then measuring a second pressure in the gas line between the flow restrictor and the chamber, then comparing the first pressure to the second pressure, and then closing the valve when the second pressure exceeds the first pressure.

A third aspect of the invention is a system for delivering gas from a sub-atmospheric gas source to a chamber and that prevents backflow into the sub-atmospheric gas source. The system comprises three different fluidly coupled sticks (i.e., branches); a purge stick, a process gas delivery stick, and an evacuation stick. The purge stick comprises a source of purge gas, a purge line fluidly connected thereto, and further comprises in order along the purge line from the source of purge gas, a pressure switch, a first flow restrictor, a first filter and a first actuated valve. The process gas delivery stick comprises a sub-atmospheric process gas source having an valve for blocking fluid communication between the gas source and a process gas line upon receipt of a first signal. The process gas line fluidly connects the valve to the chamber. The process gas delivery system further comprises, in order along the process gas line from the valve to the chamber, a first pressure transducer capable of generating a second signal representative of the pressure at the first pressure transducer, the first actuated valve which fluidly connects the purge stick to the process gas delivery stick, a second actuated valve, a first isolation valve, a second pressure transducer, a second isolation valve, a second filter, a third isolation valve, a second flow restrictor, a third pressure transducer capable of generating a third signal representative of pressure at the third pressure transducer, and a fourth isolation valve. The evacuation stick comprises a source of evacuation gas and an evacuation gas line fluidly connected thereto, and further comprises in order along the evacuation gas line, a fifth isolation valve, a vacuum generator having a branch evacuation line fluidly connected to the second actuated valve, thereby fluidly connecting the evacuation stick to the process gas delivery stick, and a vent. The system further includes a valve controller unit connected to the sub-atmospheric gas source valve, and to the first and third pressure transducers. The valve controller unit is capable of comparing the aforementioned first signal as a function of the second and third signals from the pressure transducers.

DETAILED DESCRIPTION OF THE INVENTION

The present invention relates to a method of and system for gas delivery from a sub-atmospheric gas source, and in particular to a backflow control apparatus and method suitable for same, that prevents gas from backflowing into the sub-atmospheric gas source. The delivery system described herein provides for the complete gas management of sub-atmospheric gases for a variety of applications, including semiconductor manufacturing and process equipment therefor. The present invention is an extension of U.S. Pat. No. 5,518,528, which patent is herein incorporated by reference. First, the backflow control apparatus is described in the context of a simplified gas delivery system. Then a complete sub-atmospheric gas delivery system incorporating the backflow apparatus of the present invention is set forth.

Figure 1:
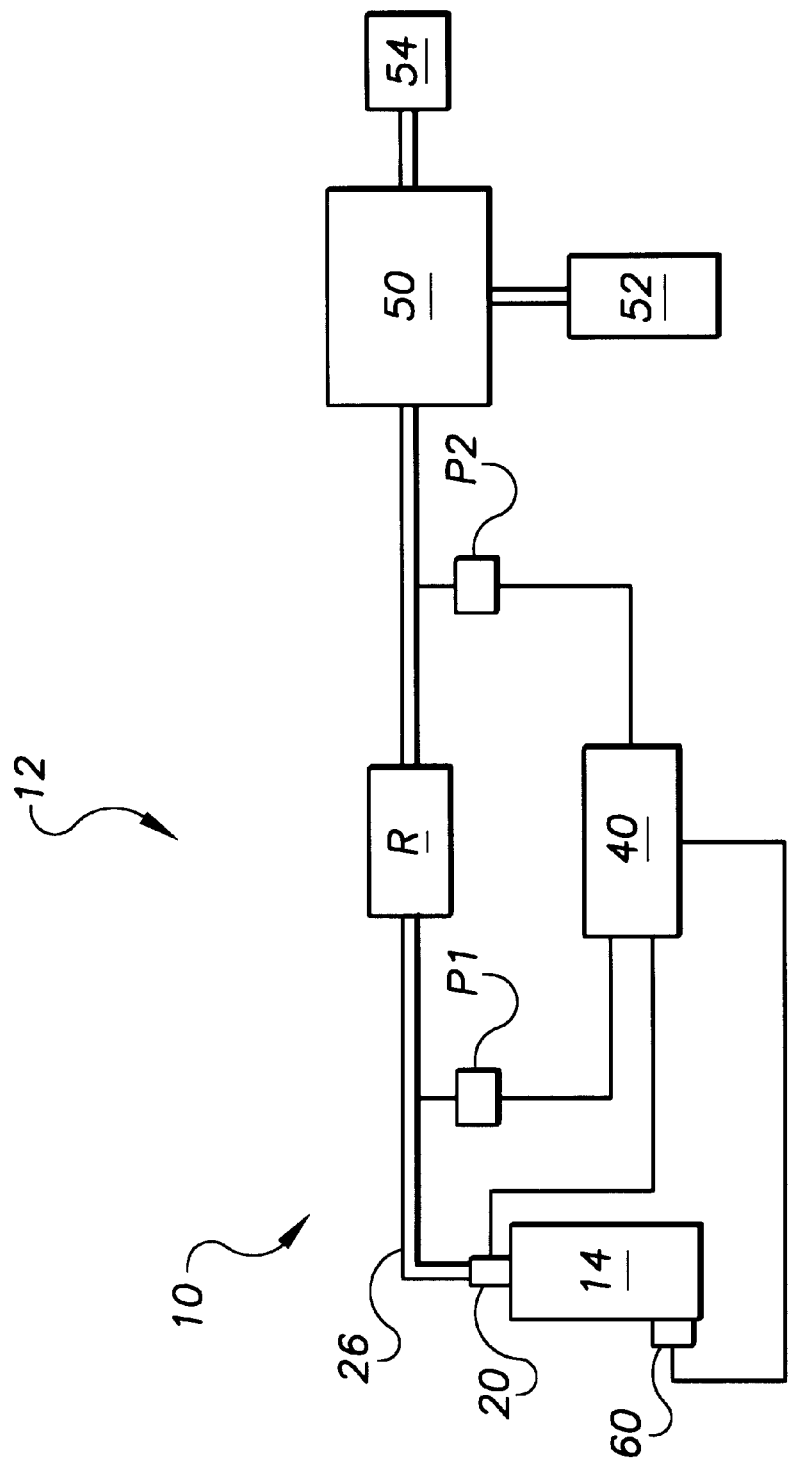
FIG. 1 is a schematic diagram illustrating the backflow control apparatus of the present invention.

With reference to FIG. 1, a backflow control apparatus 10 for preventing gas backflow is now described in the context of its use in a simplified gas delivery system 12. The latter comprises a sub-atmospheric gas source 14 for providing a first gas. Sub-atmospheric gas source 14 may be, for example, a cannister containing $PH_3$ gas adsorbed in a microporous media at a pressure less than 760 torr, e.g., between 600 torr and 20 torr at room temperature (21° C.).

System 12 further includes a valve 20 attached to or in immediate fluid communication with gas source 14. A gas line 26 is connected to valve 20. The latter is a blocking valve capable of blocking fluid communication between sub-atmospheric gas source 14 and gas line 26 upon receipt of a signal (e.g., a pneumatic signal or an electrical signal). Gas line 26 may be, for example, seamless stainless steel tubing with a maximum internal finish of 10 Ra. Along gas line 26 is arranged, in order from valve 20, a first pressure transducer P1, a flow restrictor R, and a second pressure transducer P2. First and second pressure transducers P1 and P2 detect the pressure of gas in gas line 26, and provide electrical output signals that vary as a function of changes in pressure in the gas line. Transducers P1 and P2 are preferably rated at 0–50 psia with a 4–20 ma output and a sensitivity of 1%. Flow restrictor R restricts the flow of gas in gas line 26, and may be any one of those known in the art, such as a mass flow controller or a filter. An exemplary flow restrictor R has a 10 Ra internal finish and is rated for 25 LPM at 30 psig nitrogen.

Gas delivery system 12 further includes a valve controller unit 40 electronically connected with first and second pressure transducers P1 and P2 (or, more generally, pressure difference sensors) and valve 20. Valve controller unit 40 may be, for example, a programmable logic controller (PLC) capable of receiving and processing signals from first and second pressure transducers P1 and P2, and generating a control signal, as described in more detail below.

Gas delivery system 12 also includes a chamber 50 at which gas line 26 terminates. Chamber 50 may be, for example, a chemical vapor deposition (CVD) process chamber wherein thin films are epitaxially deposited on silicon wafers as part of the process for manufacturing semiconductor devices. Connected to chamber 50 is a gas source 52, which provides one or more additional gases (e.g., $O_2$) to chamber 50 for carrying out reactions therein. Also connected to chamber 50 is a vacuum pump 54 for maintaining the chamber at a suitably low pressure.

With continuing reference to FIG. 1, backflow control apparatus 10 of the present invention comprises valve 20, gas line 26, first and second pressure transducers P1 and P2, flow restrictor R, and valve controller unit 40 capable of providing the aforementioned signal to valve 20.

The operation of backflow control apparatus 10 as part of gas delivery system 12 is now described. When gas delivery system 12 is functioning properly, the pressure in chamber 50 is less than that of sub-atmospheric gas source 14 so that gas can flow from the sub-atmospheric gas source to the chamber. However, it is possible that the pressure in chamber 50 can become greater than that in sub-atmospheric gas source 14, resulting in the flow of gas from the chamber to the sub-atmospheric gas source. This phenomenon is referred to herein as "backflow." A backflow situation may arise, for example, by the failure of vacuum pump 54, or by an excess flow of one or more gases from gas source 52. Backflow may also occur due to a leak in system 12 (e.g., in gas line 26). Backflow of a second gas (i.e., a gas other than the gas present in sub-atmospheric gas source 14) into sub-atmospheric gas source 14 is particularly undesirable for two main reasons. The first reason is that the second gas will contaminate sub-atmospheric gas source 14. The second reason is that certain combinations of gases can result in dangerous reactions, creating a safety hazard. For example, the combination of $PH_3$ gas and $O_2$ gas (from the atmosphere or from gas source 52) can result in a dangerously exothermic reaction.

Accordingly, with continuing reference to FIG. 1, during operation of gas delivery system 12, backflow control apparatus 10 operates to prevent backflow as follows. Pressure transducer P1 monitors the pressure p1 in gas line 26 between valve 20 and flow restrictor R, while pressure transducer P2 monitors the pressure p2 in the gag line between the flow restrictor and chamber 50. Under normal operating conditions, pressure p1 is greater than pressure p2. For example, in a gas delivery system for a CVD process tool, p1 may range from 20–600 torr (e.g., 600 torr for a full cylinder and 20 torr for a nearly empty cylinder), while p2 may range from 0–20 torr, with P1>P2.

During the operation of gas delivery system 12, pressure transducers P1 and P2 generate first and second signals, respectively, corresponding to pressures p1 and p2, respectively. These first and second signals are sent to valve controller unit 40, which performs a comparison of the signals. If p1 becomes less than p2, the pressure gradient has reversed, allowing backflow of gas into sub-atmospheric gas source 14. Accordingly, when pressure p1 is less than p2, or alternatively, when pressure p1 is within a certain value (set point) to pressure p2 (e.g., within 5 torr), valve controller unit 40 sends the aforementioned signal (e.g., a third signal) to valve 20. This third signal causes valve 20 to close, thereby preventing backflow of gas into sub-atmospheric gas source 14.

With continuing reference to FIG. 1, as an optional addition, backflow control apparatus 10 may include a temperature sensor 60 in thermal communication with sub-atmospheric gas source 14 and in electronic communication with valve controller unit 40. Temperature sensor 60 may be, for example, a thermocouple attached to sub-atmospheric gas source 14 or an infra-red detector for sensing infra-red radiation from the sub-atmospheric gas source. Temperature sensor 60 monitors the temperature of sub-atmospheric gas source 14 by sending a signal corresponding to the temperature to valve controller unit 40. If there is backflow from chamber 50, or if there is a leak in gas line 26 such that an exothermic reaction occurs in sub-atmospheric gas source 14, the temperature of the gas source will rise. The rise in temperature of sub-atmospheric gas source 14 is then sensed by valve controller unit 40, which sends a signal to valve 20 causing it to close. At this point, valve controller unit 40 may also display a visual signal or emit an audio signal when the temperature rises to a threshold temperature or follows a predetermined temperature vs. time curve, stored within the backflow controller, characteristic of an exothermic reaction with the gas source. Such temperature vs. time curves can be determined empirically.

Alternatively, temperature sensor 60 may be a mechanical temperature thermo-switch hardwired directly to valve 20. The thermo-switch detects the temperature of sub-atmospheric gas source 14. When the gas source temperature reaches a predetermined value, the thermo-switch sends a signal directly to valve 20 to close the valve, rather than via valve controller unit 40.

Figure 2:
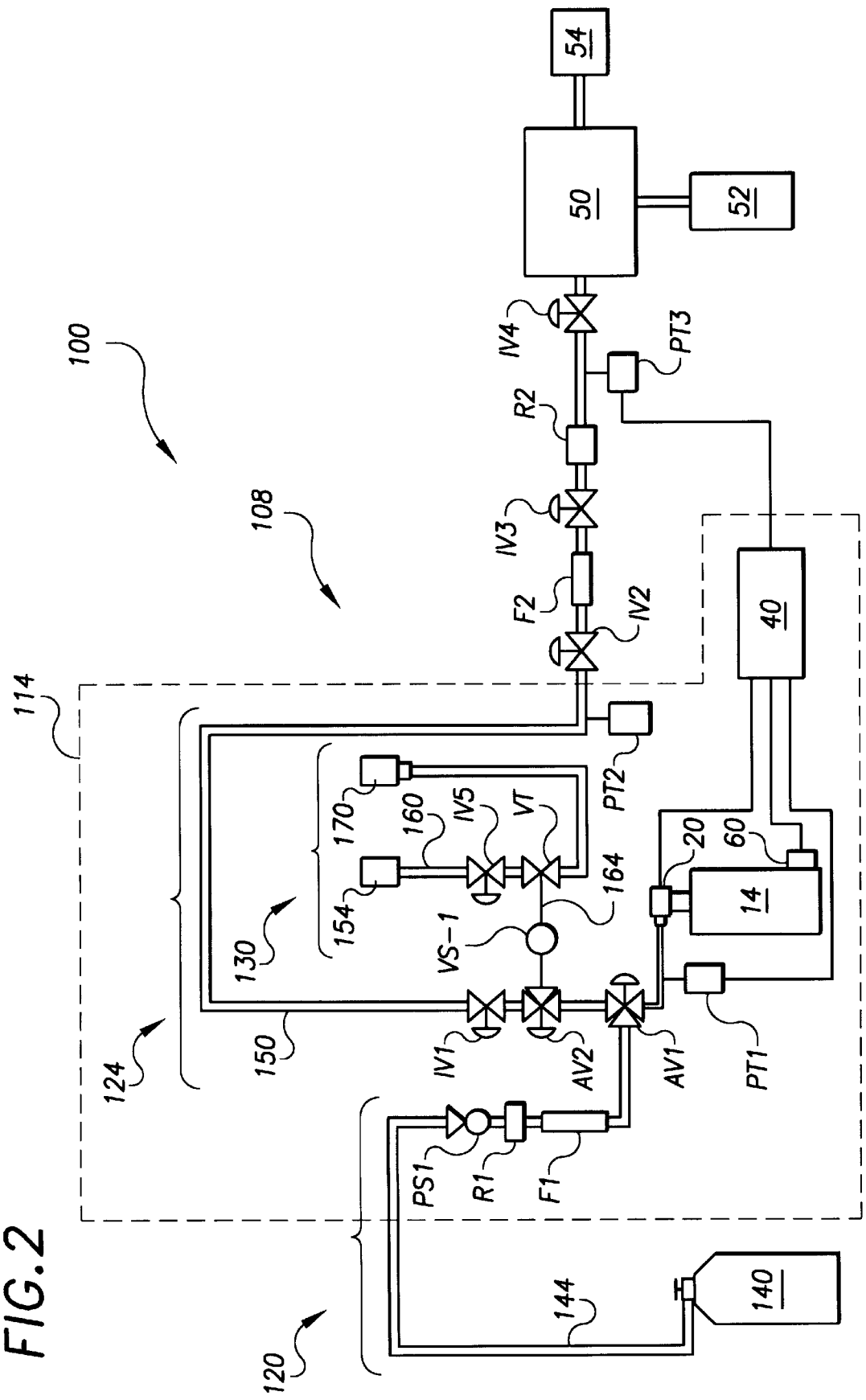
FIG. 2 is a schematic diagram illustrating the gas delivery system of the present invention which includes the backflow control apparatus of the present invention.

With reference now to FIG. 2, a complete sub-atmospheric gas delivery system 100 incorporating backflow control apparatus 10 of FIG. 1 is discussed. Where appropriate, the same reference symbols as used in gas delivery system 10 are used to describe gas delivery system 100.

Gas delivery system look comprises a sub-atmospheric gas source 14, valve 20, a distribution manifold 108, and valve control unit 40. Gas delivery system 100 is connected to chamber 50, which is in fluid communication with second gas source 52 and vacuum pump 54. Gas delivery system 100 also preferably includes a cabinet 114 (dashed line) enclosing a portion of the gas delivery system.

Distribution manifold 108 comprises three different interconnected branches or "sticks": a purge stick 120, a process gas delivery stick 124, and an evacuation ("venturi") stick 130. Purge stick 120 include purge gas source 140, such as a cannister of nitrogen ($N_2$) or other inert gas, and a purge gas line 144. Along the latter is included, in order from purge gas source 140, a pressure switch PS1, a first restrictor R1, a first filter F1 and an first actuated valve AV1. Process gas delivery stick 124 includes sub-atmospheric gas source 14, valve 2 which is controlled by valve controller unit 40, and a gas line 150 connected to valve 20. Process gas delivery stick 124 further includes, in order along gas line 150 from valve 20, a first pressure transducer PT1, first actuated valve AV1 (in common with purge stick 120), a second actuated valve AV2, one or more second isolation valves IV1, and a second pressure transducer PT2 arranged directly downstream from the first isolation valve IV1 that is farthest from gas source 14 and still within cabinet 114. Process gas delivery stick 124 also preferably includes along gas line 150, between cabinet 114 and chamber 50, one or more additional isolation valves, such as valves IV2–IV4, one or more filters, such as second filter F2, and one or more additional flow restrictors, such as second flow restrictor R2. Process gas delivery stick 124 also includes a third pressure transducer PT3 arranged along gas line 150 chamber-wise (i.e., downstream) of flow restrictor R2 and in electronic communication with valve controller unit 40.

With continuing reference to FIG. 2, evacuation stick 130 comprises an evacuation gas source 154, such as an N2 gas cannister, and an evacuation gas line 160 connected thereto. Evacuation stick 130 further comprises, in order along gas line 160 from gas source 154, a fifth isolation valve IV5 and a vacuum generator VT, Such as a venturi type vacuum generator. Stemming from vacuum generator VT is a branch evacuation gas line 164 leading to second actuated valve AV2, thereby connecting evacuation stick 130 and process gas delivery stick 124. A vacuum switch VS1 is arranged within line 164 between vacuum generator VT and valve AV2. Evacuation line 1610 continues from vacuum generator VT and leads to a vent 170.

The operation of gas delivery system 100 is now described. First, purge stick 120 is used to purge process gas delivery stick 124 of reactive gases. Accordingly, purge stick 120 provides, from purge gas source 140, compressed (e.g., 5–30 psig) inert gas, such as N2. The purge gas is introduced into process gas delivery stick 124 by actuating actuated valve AV1 so that the purge gas can flow into process gas line 150 toward chamber 50. After the purge step is complete, actuated valve AV1 is closed After the purge process, evacuation of process gas delivery stick 124 is accomplished by activating evacuation stick 130. This involves closing one of isolation valves IV2–IV4, and adjusting actuated valve AV2 so that branch evacuation line 164 is in fluid communication with gas line 150. Isolation valves IV5 is then opened and vacuum switch VS1 is activated to allow vacuum generator VT to communicate with gas line 150. In this arrangement, the flow of compressed (e.g., 60 psi) gas through evacuation line 160 and vacuum generator VT creates negative pressure between gas line 150 and evacuation line 160, drawing gas present in process gas delivery stick 124 through evacuation line 164, to evacuation line 160 and out of the system through vent 170.

After process gas delivery stick 124 is evacuated, the next step is to deliver the process gas to chamber 50 using the process gas delivery stick. This is accomplished by opening cylinder valve 20 and adjusting valves IV1–IV4 so that gas from sub-atmospheric gas source 14 can flow into chamber 50. Pressure transducer PT2, located adjacent and downstream of first isolation valve IV2, is used primarily to monitor the pressure downstream of the first isolation valve when this valve is in the closed position. As discussed above in connector with gas delivery system 10, the pressure within chamber 50 is maintained at a value less than that of sub-atmospheric gas source 14, resulting in a pressure gradient that causes gas within sub-atmospheric gas source 14 to flow toward chamber 50.

As mentioned above, gas delivery system 100 includes backflow control apparatus 12, namely, in the present arrangement, valve 20, gas line 150, first and third pressure transducers PT1 and PT3 (serving the function of pressure transducers P1 and P2 of FIG.1), flow restrictor R2, valve controller unit 40, and preferably temperature sensor 60 in electronic communication with valve controller unit 40, or alternatively, in direct electronic communication with valve 20. As described in detail above in connection with gas delivery system 10, backflow control apparatus 12 prevents the backflow of gas to sub-atmospheric gas source 14 and, in a preferred embodiment, is also capable of monitoring a temperature rise in the sub-atmospheric gas source and closing off same While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A backflow control apparatus for use with a sub-atmospheric gas source and a chamber, for preventing backflow into the sub-atmospheric gas source, the apparatus comprising:
   a) a gas line fluidly coupling the sub-atmospheric gas source and the chamber;
   b) a valve in fluid communication with the sub-atmospheric gas source, for blocking fluid communication between the gas source and said gas line upon receipt of a first signal;
   c) a flow restrictor in fluid communication with said gas line and positioned between said valve and the chamber;
   d) a first pressure transducer in fluid communication with said gas line between said valve and said flow restrictor, capable of generating a second signal representative of the pressure in said gas line between said valve an said flow restrictor;
   e) a second pressure transducer in fluid communication with said gas line between said first pressure transducer and the chamber, capable of generating a third signal representative of the pressure in said gas line between said restrictor and the chamber; and
   f) a valve controller unit connected to said first pressure transducer, said second pressure transducer and said valve, said controller capable of generating said first signal in response to said second and third signals.

2. An apparatus according to claim 1, wherein said flow restrictor is a mass flow controller.

3. An apparatus according to claim 1, wherein said flow restrictor is a filter.

4. An apparatus according to claim 1, further including a temperature sensor in thermal communication with the sub-atmospheric gas source and connected to said controller, said temperature sensor capable of generating a fourth signal representative of the temperature of the sub-atmospheric gas source, wherein said controller generates said first signal in response to said fourth signal.

5. An apparatus according to claim 4, wherein said temperature sensor is one from the group consisting of infra-red optical sensor and thermocouple.

6. An apparatus according to claim 1, further including a temperature sensor in thermal communication with the sub-atmospheric gas source and connected to said valve, said temperature sensor capable of generating a fourth signal for controlling said valve.

7. An apparatus according claim 6, wherein said temperature sensor is a thermo-switch.

8. An apparatus according to claim 1, wherein said second pressure transducer is between said flow restrictor and the chamber.

9. An apparatus for monitoring and preventing backflow into a sub-atmospheric gas source, the apparatus comprising:
   a) a valve in fluid communication with the sub-atmospheric gas source, for blocking fluid communication with the gas source upon receipt of a first signal;
   b) a temperature sensor, in thermal communication with the sub-atmospheric gas source, capable of generating a second signal representative of the temperature of the sub-atmospheric gas source; and
   c) a valve controller unit connected to said valve and said temperature sensor, capable of generating said first signal in response to said second signal.

10. An apparatus according to claim 9, wherein said temperature sensor is one from the group consisting of infrared optical sensor and thermocouple.

11. A system according to claim 9, further comprising a gas line fluidly coupled with said valve and a component for determining pressure differences within said gas line and providing a third signal that varies as a function of said pressure differences, wherein said component is connected to said valve controller.

12. An apparatus for monitoring and preventing backflow of a gas into a sub-atmospheric gas source, the apparatus comprising:
   a) a valve in fluid communication with the sub-atmospheric gas source, for blocking fluid communication with the gas source upon receipt of a first signal; and
   b) a temperature sensor in thermal communication with the sub-atmospheric gas source and connected to said valve, said temperature sensor capable of generating said first signal representative of the temperature of the sub-atmospheric gas source.

13. An apparatus according to claim 12, wherein said temperature sensor is a thermo-switch.

14. A system for delivering gas from a sub-atmospheric gas source to a chamber and that prevents backflow into the sub-atmospheric gas source, the system comprising:
   a) a purge stick comprising a source of purge gas, a purge line connected thereto, and further comprising in order along the purge line from said source of purge gas, a pressure switch, a first flow restrictor, a first filter and a first actuated valve;
   b) a process gas delivery stick comprising a sub-atmospheric process gas source having a blocking valve for blocking fluid communication with said sub-atmospheric gas source upon receipt of a first signal, and a process gas line fluidly connecting said valve to the chamber, said process gas delivery system further comprising in order along said process gas line from said valve to the chamber, a first pressure transducer capable of generating a second signal representative of the pressure at said first pressure transducer, said first actuated valve which fluidly connects said purge stick to said process gas delivery stick, a second actuated valve, a first isolation valve, a second pressure transducer, a third isolation valve, a second filter, a third isolation valve, a second flow restrictor, a third pressure transducer capable of generating a third signal representative of pressure at said third pressure transducer, and a fourth isolation valve; and
   c) an evacuation stick comprising a source of evacuation gas and an evacuation gas line connected thereto, and further comprising in order along said evacuation gas line, a fifth isolation valve, a vacuum generator having a branch evacuation line fluidly connected to said second actuated valve thereby fluidly connecting said evacuation stick to said process gas delivery stick, and a vent;

d) a valve controller unit connected to said blocking valve, said first pressure transducer and said third pressure transducer, and capable of generating said first signal in response to said second and third signals.

15. A system according to claim 14, further comprising:

a) a temperature sensor in thermal communication with said sub-atmospheric process gas source and said valve and capable of generating a fourth signal representative of said sub-atmospheric process gas source temperature so as to open and close said valve.

16. A system according to claim 14, further comprising:

a) a temperature sensor in thermal communication with said sub-atmospheric process gas source and valve controller unit and capable of providing fourth signal representative of said sub-atmospheric process gas source to said valve controller so as to allow said valve controlled unit to generate said first signal as a function of said fourth signal.

17. A gas flow system comprising:

a) a pipe for flowing fluid between a source and a destination;

b) a mechanical valve in said pipe;

c) an electronic controller for controlling the position of said valve; and d) a pressure difference sensor capable of providing a pressure difference signal to said electronic controller, wherein said controller controls the position of said valve based on said pressure difference signal, said pressure difference sensor for reading a pressure difference between two locations in the system wherein said valve is closed when the pressure is higher at a location in the system distant, than at a location near, said source.

18. A system according to claim 17, wherein the controller changes the position of the valve when the pressure difference signal reaches a predetermined value.

19. A system according to claim 18, wherein the controller closes the valve when the pressure difference signal is less than the predetermined value.

20. A system according to claim 18, wherein the controller opens the valve when the pressure difference signal exceeds the predetermined value.

21. A system according to claim 17, wherein the pressure difference sensor comprises a pressure transducer.

22. A system according to claim 17, wherein said pressure difference sensor comprises a first pressure transducer, a second pressure transducer, and wherein said pressure difference signal is determined from the difference of the respective pressures as determined by said first and second pressure transducers.

23. A system according to claim 22, wherein said first pressure transducer is arranged in series with said second pressure transducer.

24. A system according to claim 17, further comprising a second mechanical valve, wherein said second mechanical valve is located between said two locations.

25. A system according to claim 17, further comprising a flow restrictor, wherein the restrictor is located between said two locations.

26. A system according to claim 17, wherein said fluid is a gas.

27. A system according to claim 17, wherein said valve introduces substantially no resistance to flow when said valve is in an open position.

28. A system according to claim 17, wherein said controller is a programmable logic controller.

29. A system according to claim 17, wherein said fluid is at sub-atmospheric pressure.

* * * * *

UNITED STATES PATENT AND TRADEMARK OFFICE
CERTIFICATE OF CORRECTION

PATENT NO: 6,155,289

DATED: December 5, 2000

INVENTOR(S): Carlsen et al.

It is certified that error appears in the above-identified patent and that said Letters Patent is hereby corrected as shown below:

In column 7, line 35, delete "an" and substitute therefor --and--;
In column 7, line 65, insert --to-- after the word "according;"
In column 9, line 20, insert --a-- after the word "providing;"
In column 9, line 23, delete "controlled" and substitute therefor --controller--.

Signed and Sealed this

First Day of May, 2001

NICHOLAS P. GODICI

*Attest:*

*Attesting Officer*     *Acting Director of the United States Patent and Trademark Office*